No. 647,635. Patented Apr. 17, 1900.
D. H. SAUNDERS.
BOX HINGING MACHINE.
(Application filed Dec. 16, 1898.)
(No Model.) 13 Sheets—Sheet 1.

Witnesses.
Karl A. Andrén.
Charles A. Harris.

Inventor.
David Henry Saunders.
by Alban Andrén
his atty.

No. 647,635. Patented Apr. 17, 1900.
D. H. SAUNDERS.
BOX HINGING MACHINE.
(Application filed Dec. 16, 1898.)
(No Model.) 13 Sheets—Sheet 6.

Witnesses.
Karl A. Andrén
Charles A. Harris

Inventor.
David Henry Saunders
by Alban Andrén his atty

No. 647,635. Patented Apr. 17, 1900.
D. H. SAUNDERS.
BOX HINGING MACHINE.
(Application filed Dec. 16, 1898.)
(No Model.) 13 Sheets—Sheet 7.

Witnesses.
Karl A. Andrén.
Charles A. Harris.

Inventor.
David Henry Saunders
by his atty.

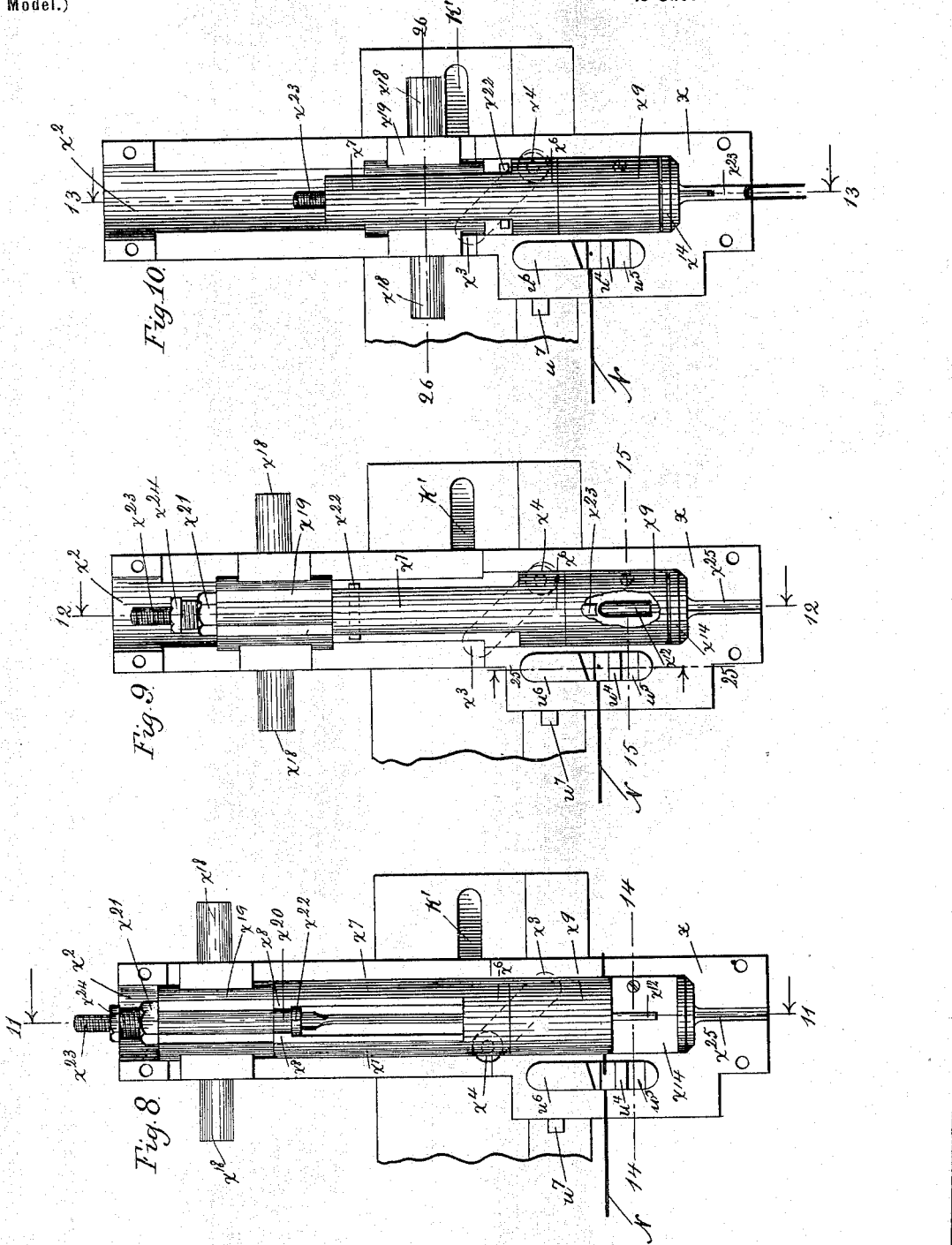

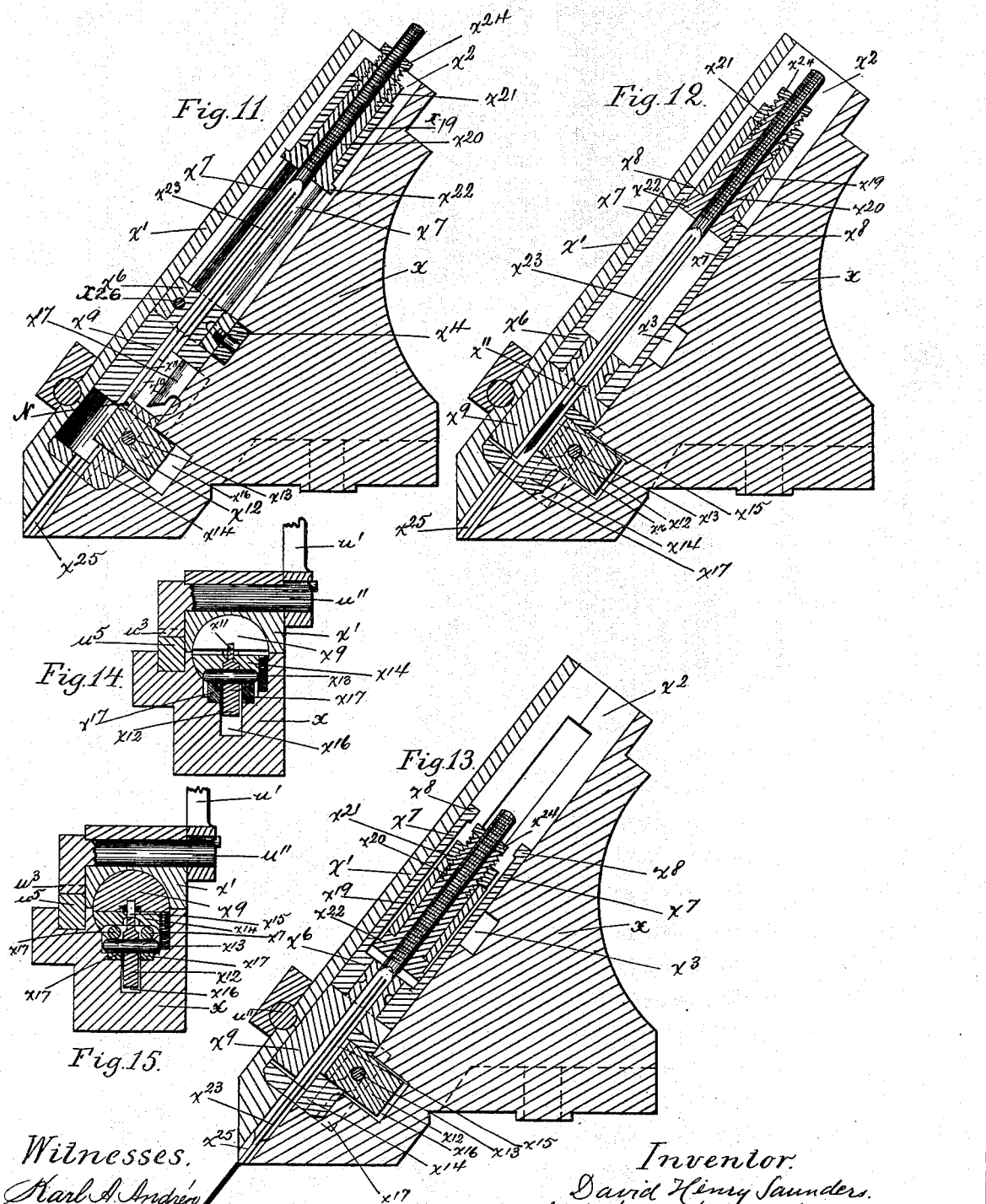

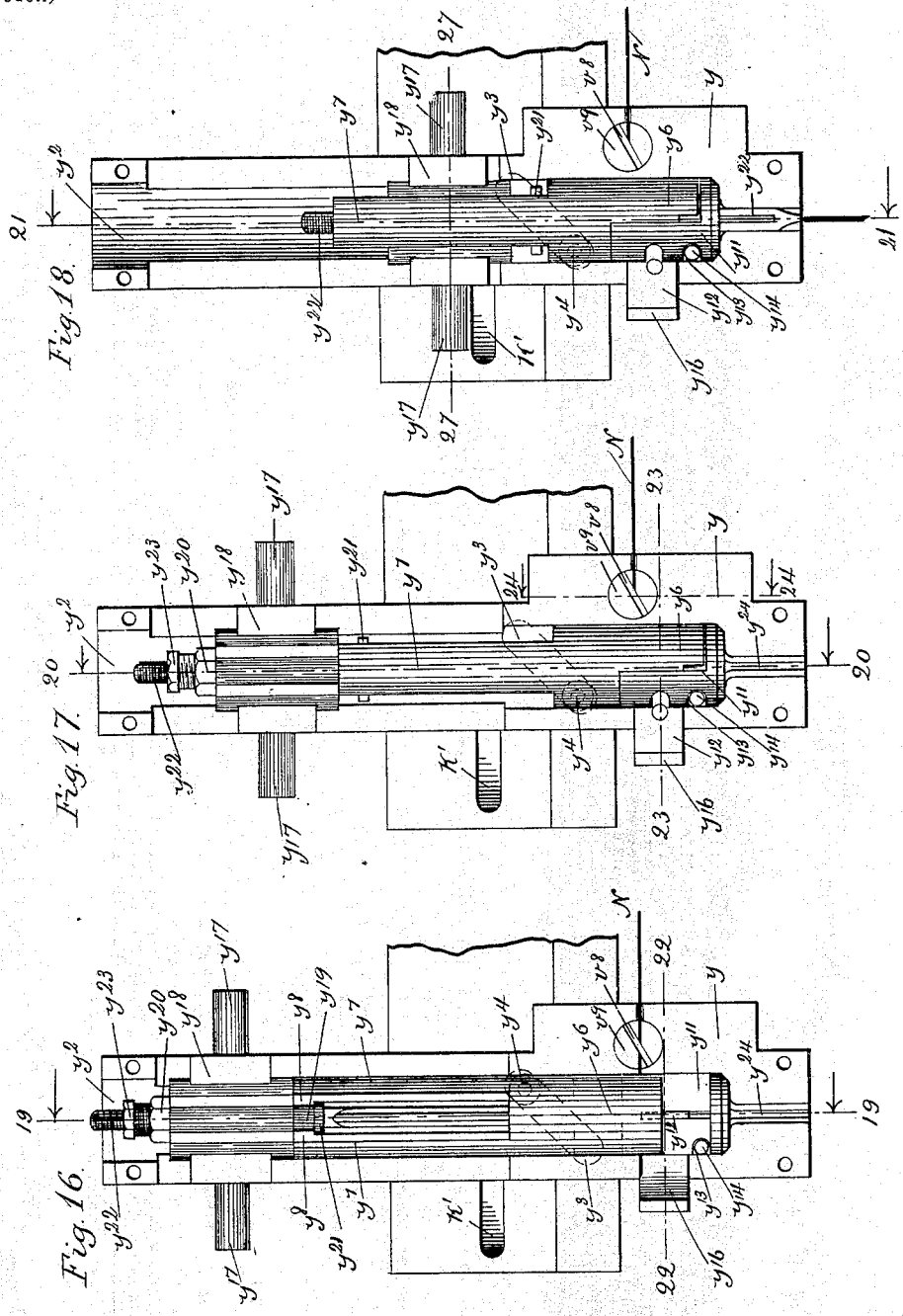

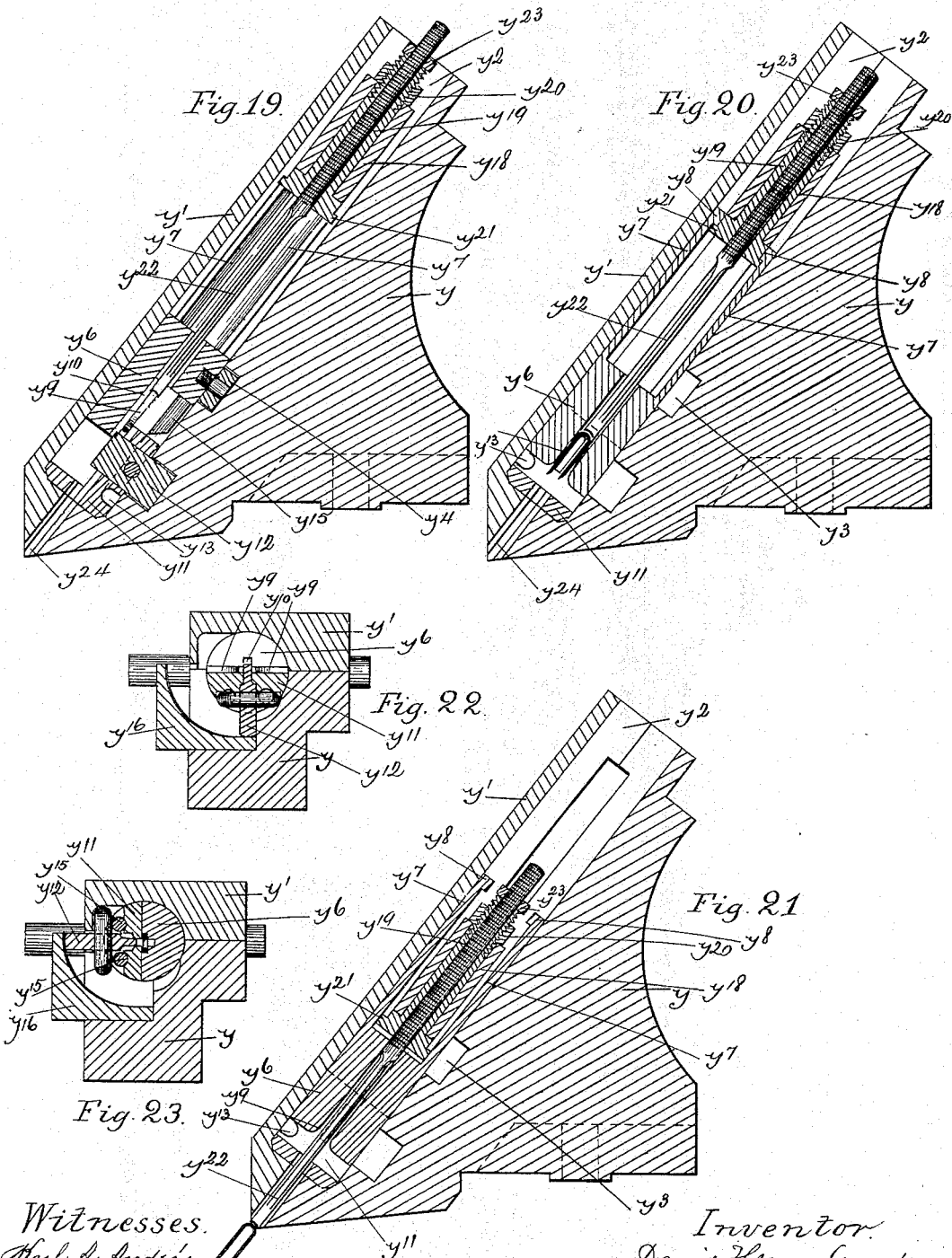

No. 647,635. Patented Apr. 17, 1900.
D. H. SAUNDERS.
BOX HINGING MACHINE.
(Application filed Dec. 16, 1898.)
(No Model.) 13 Sheets—Sheet 12.
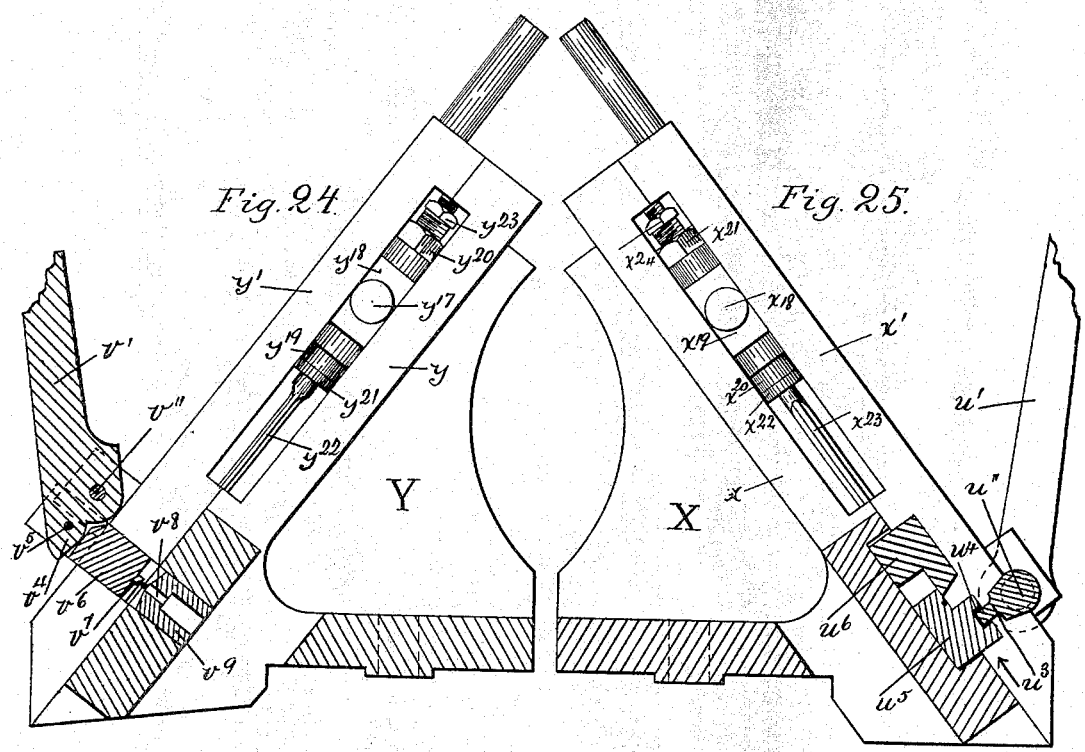
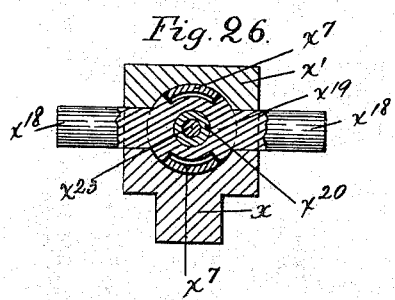
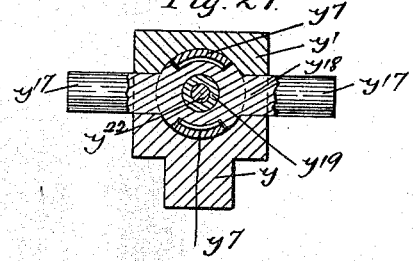
Witnesses.
Karl A. Andrén.
Charles A. Harris
Inventor.
David Henry Saunders
by Karl Andrén
his atty.

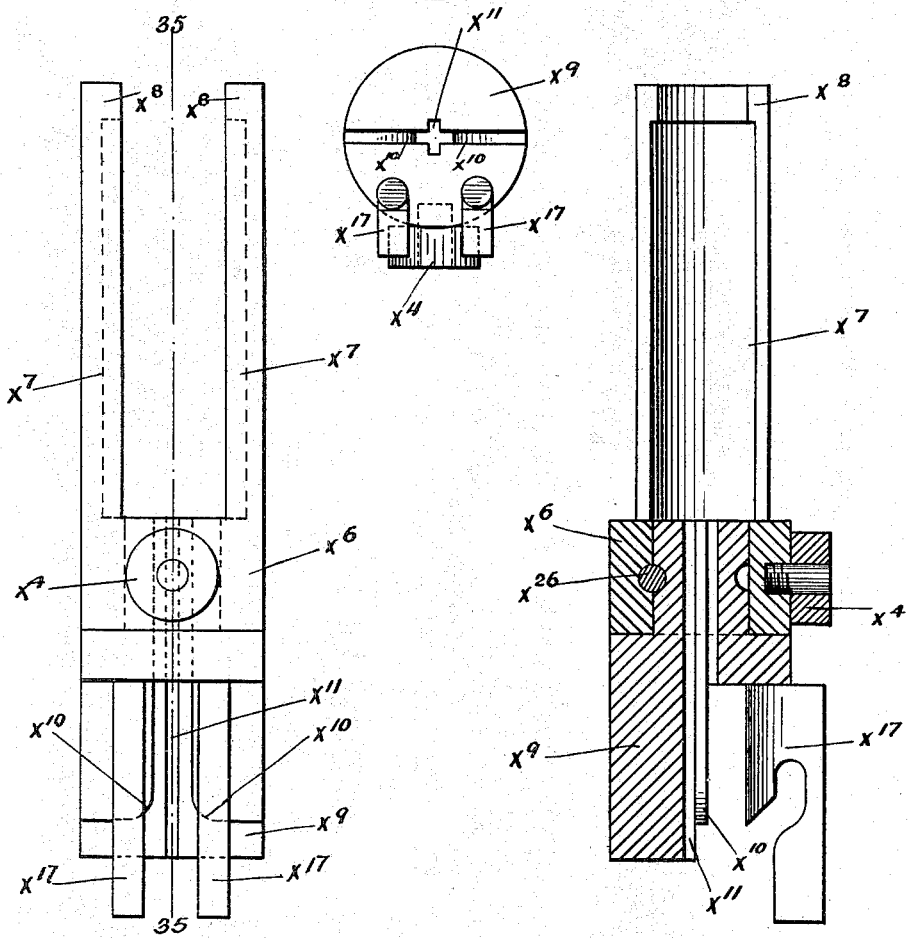

UNITED STATES PATENT OFFICE.

DAVID HENRY SAUNDERS, OF GLOUCESTER, MASSACHUSETTS, ASSIGNOR OF FIFTEEN-SIXTEENTHS TO N. RICHARDSON SONS AND SAMUEL L. MERCHANT, OF SAME PLACE.

BOX-HINGING MACHINE.

SPECIFICATION forming part of Letters Patent No. 647,635, dated April 17, 1900.

Application filed December 16, 1898. Serial No. 699,498. (No model.)

*To all whom it may concern:*

Be it known that I, DAVID HENRY SAUNDERS, a citizen of the United States, residing at Gloucester, in the county of Essex and State of Massachusetts, have invented new and useful Improvements in Box-Hinging Machines, of which the following is a specification.

This invention relates to improvements in box-hinging machines for the purpose of automatically hinging wooden boxes by means of interlocking wire staples; and it consists of automatic mechanism for feeding, straightening, cutting, and pointing steel wire of which the staples are made, automatic mechanism for forming and driving the staples interlocked in the cover and body of the wooden boxes and clenching the same, automatic mechanism for placing the boxes in position for hinging and for clamping them during the hinging operation, automatic mechanism for releasing the same when hinged and for returning them to the operator, and of other mechanism, as will hereinafter be more fully shown and described, reference being had to the accompanying drawings, wherein—

Figure 1:
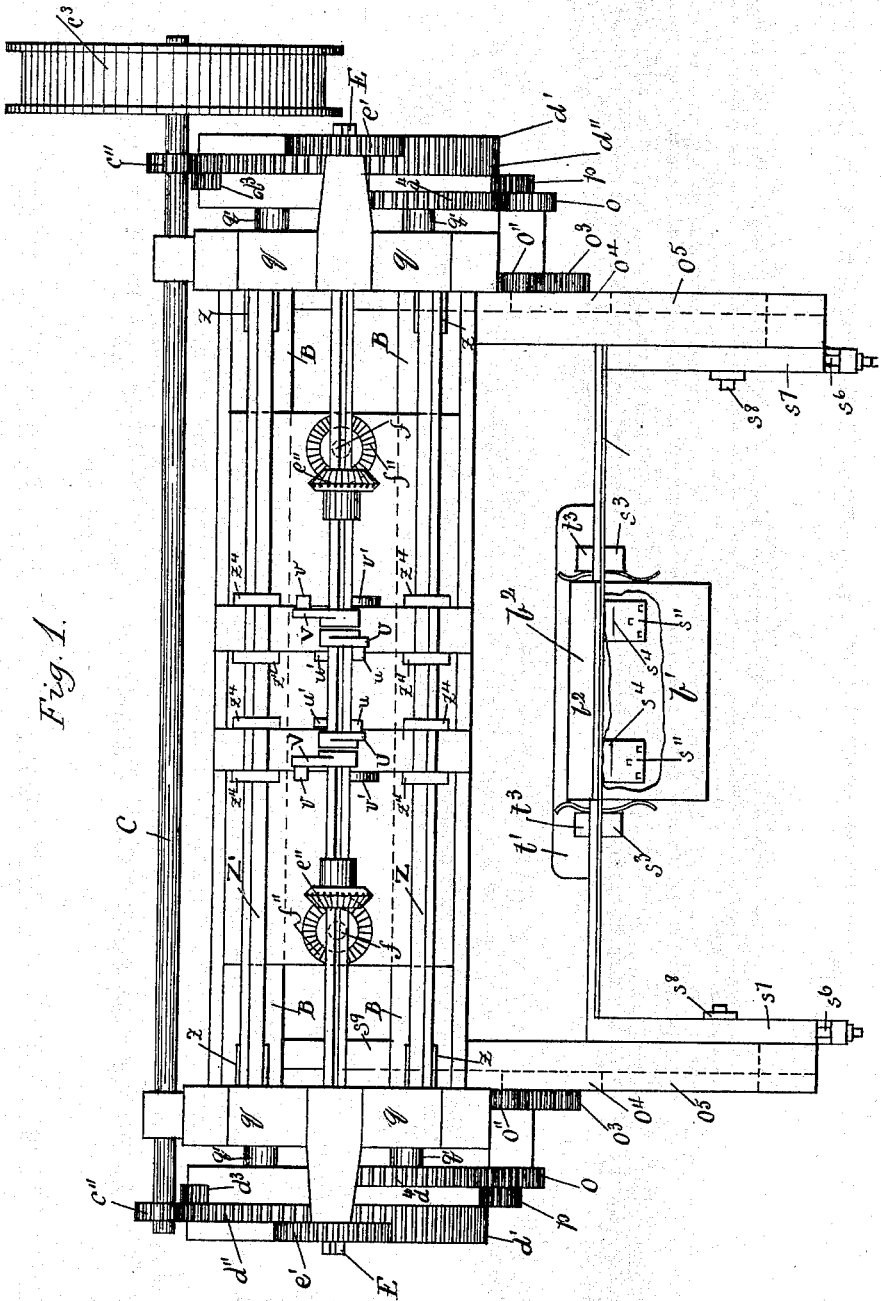
Figure 2:
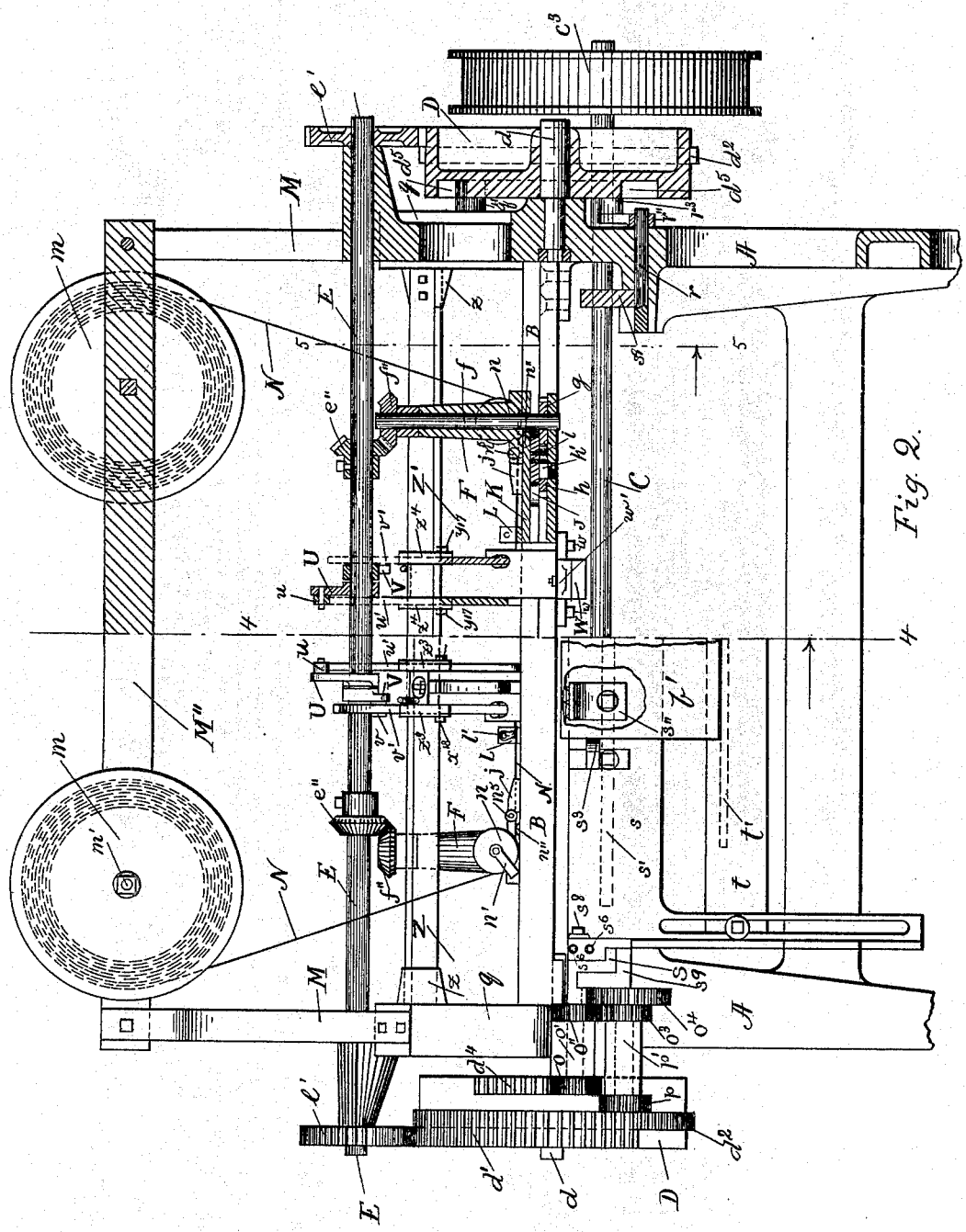
Figure 3:
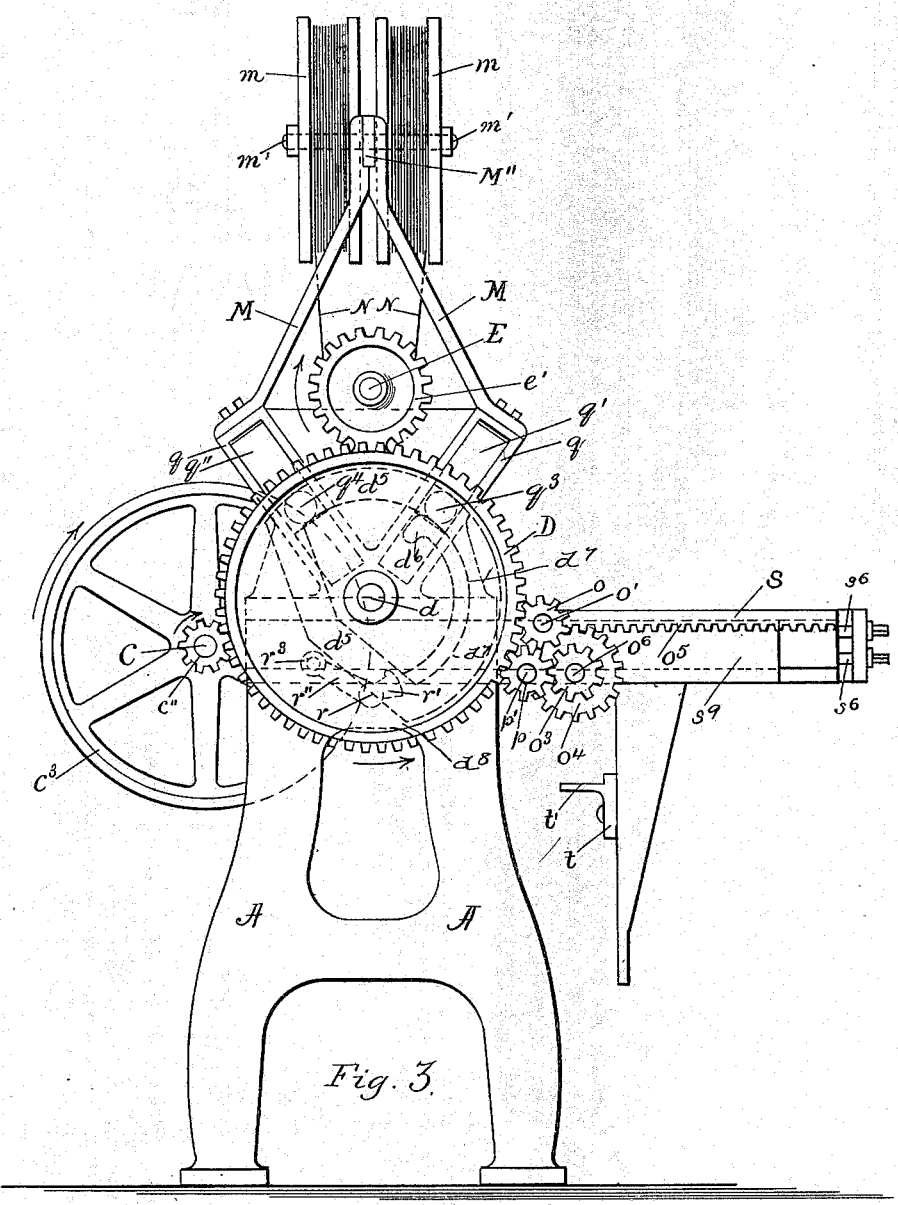
Figure 4:
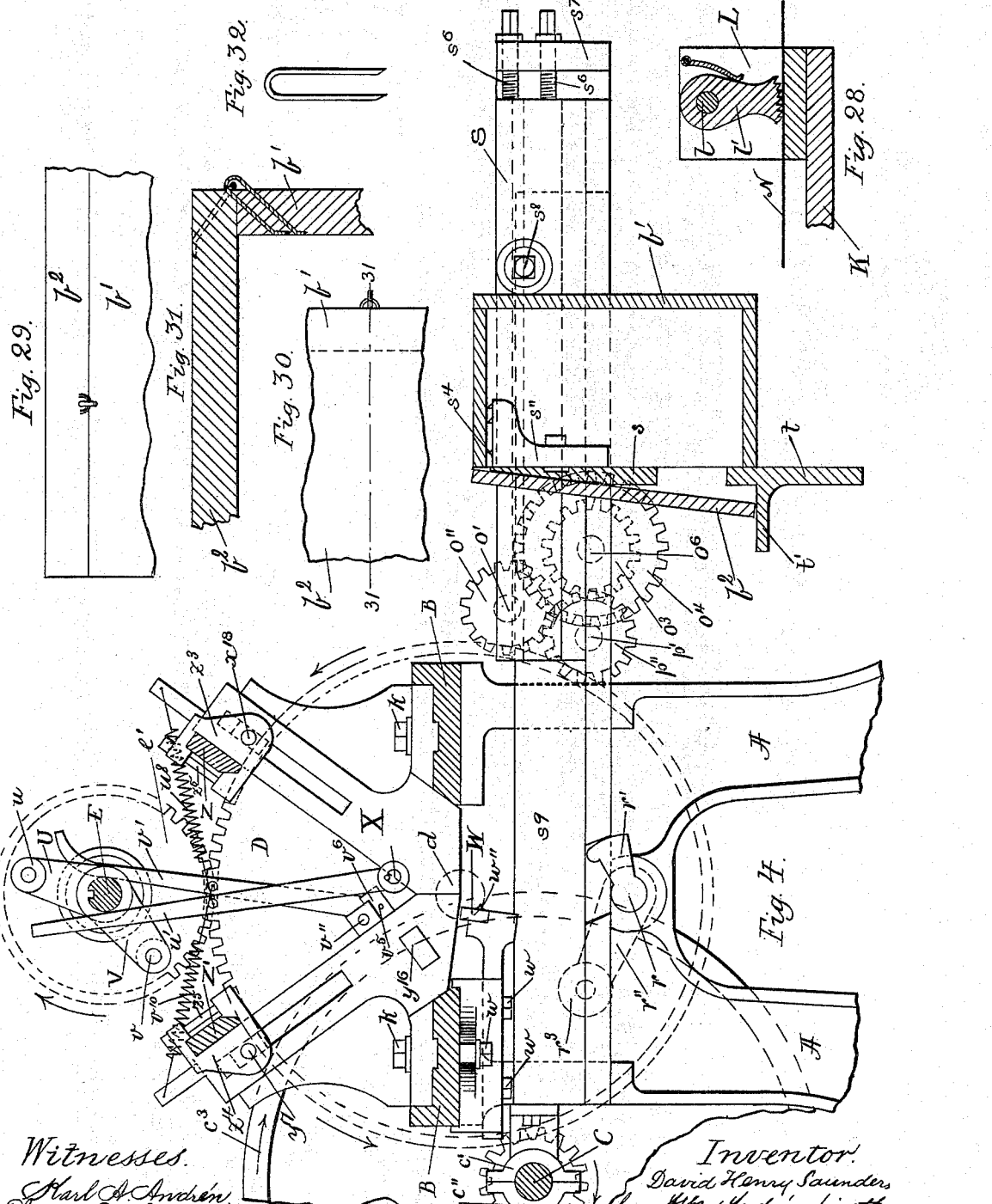
Figure 5:
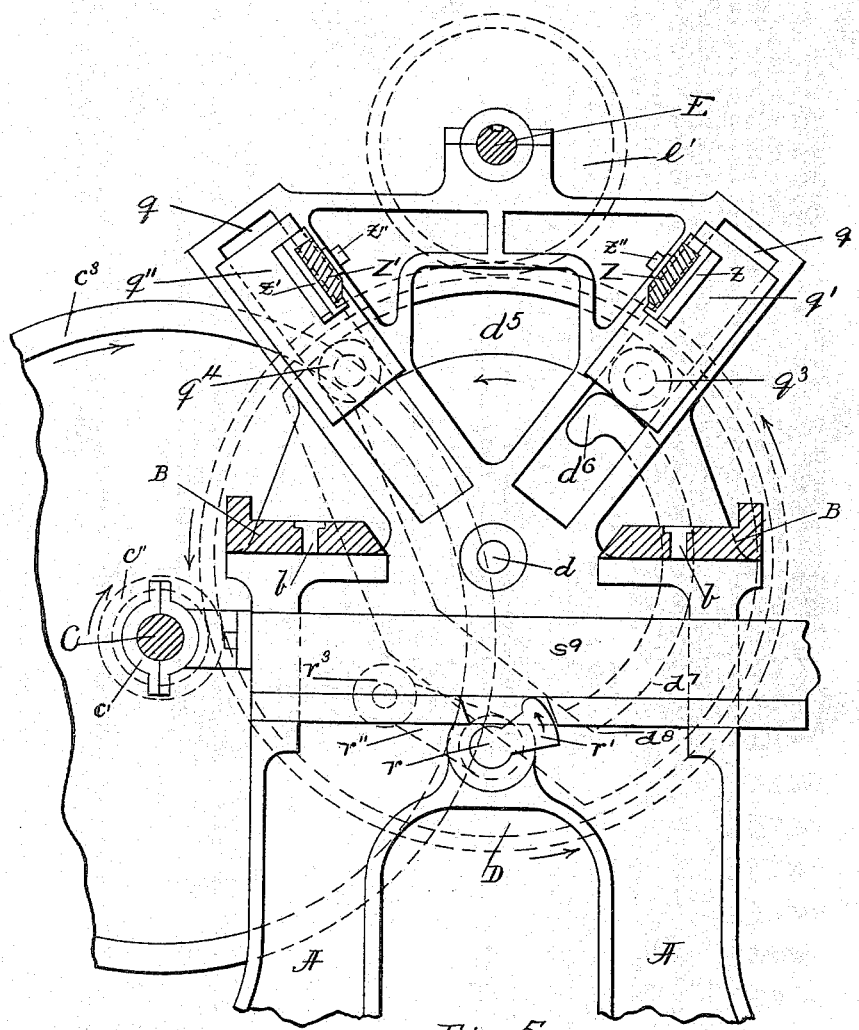
Figure 6:
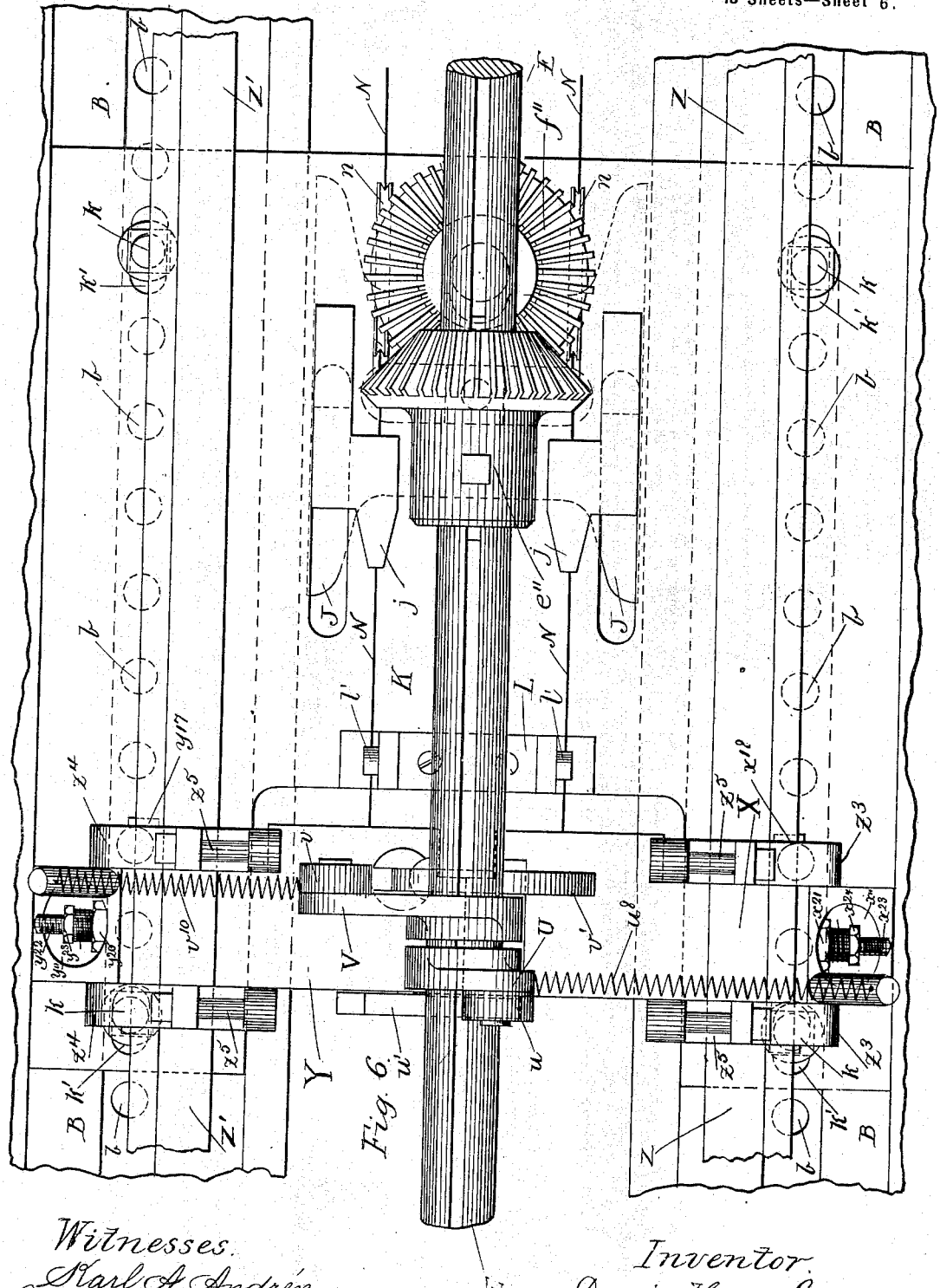
Figure 7:
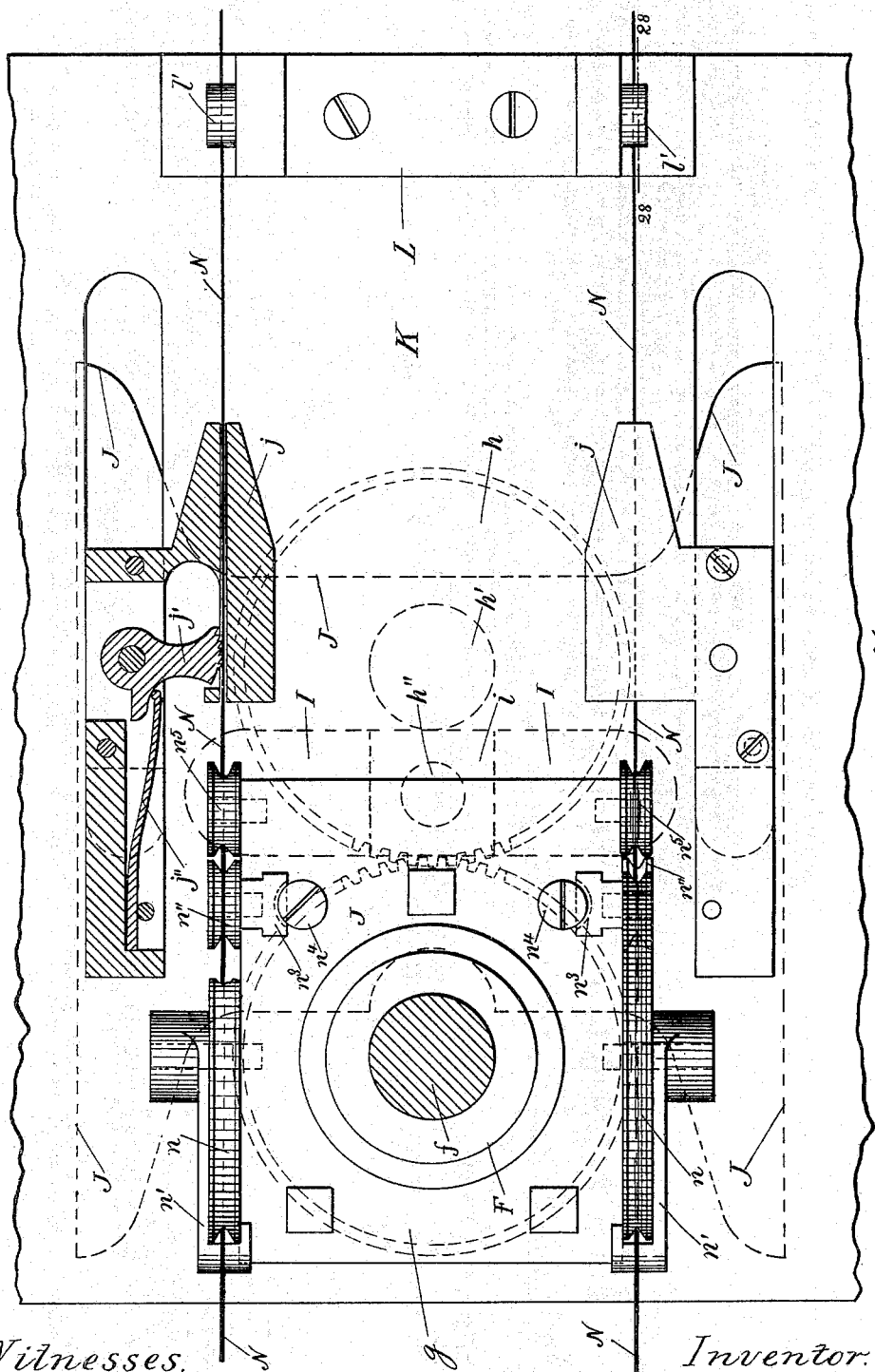

Figure 1 represents a top plan view of the machine having the wire-reels and their supports removed. Fig. 2 represents a partial side elevation, one-half being shown in longitudinal section. Fig. 3 represents an end view in the direction of arrow shown in Fig. 2. Fig. 4 represents a vertical cross-section on the line 4 4 shown in Fig. 2. Fig. 5 represents a vertical cross-section on the line 5 5 shown in Fig. 2. Fig. 6 represents an enlarged detail top plan view of one set of drivers and their relation to the wire feeding and straightening mechanism. Fig. 7 represents an enlarged detail top plan view of the wire straightening and feeding device, such view being partly shown in section. Fig. 8 represents a front elevation of one of the drivers for the box-cover staples, having its casing removed and showing the hammer in its uppermost position. Fig. 9 represents a front elevation of the same, showing the hammer in its mid-position and the staple just formed. Fig. 10 represents a front elevation of the same, showing the hammer in its lowest position and the staple just driven out of its guides. Fig. 11 represents a central longitudinal section on the line 11 11 shown in Fig. 8. Fig. 12 represents a central longitudinal section on the line 12 12 shown in Fig. 9. Fig. 13 represents a central longitudinal section on the line 13 13 shown in Fig. 10. Fig. 14 represents a cross-section on the line 14 14 shown in Fig. 8. Fig. 15 represents a cross-section on the line 15 15 shown in Fig. 9. Fig. 16 represents a front elevation of one of the drivers for the box-body staples, having its casing removed and showing the hammer in its uppermost position. Fig. 17 represents a front elevation of the same, showing the hammer in its mid-position. Fig. 18 represents a front elevation of the same, showing the hammer in its lowest position and the staple just driven out of its guides. Fig. 19 represents a central longitudinal section on the line 19 19 shown in Fig. 16. Fig. 20 represents a central longitudinal section on the line 20 20 shown in Fig. 17. Fig. 21 represents a central longitudinal section on the line 21 21 shown in Fig. 18. Fig. 22 represents a cross-section on the line 22 22 shown in Fig. 16. Fig. 23 represents a cross-section on the line 23 23 shown in Fig. 17. Fig. 24 represents a cross-section on the line 24 24 shown in Fig. 17, showing the cutting-off device for the wire in section and the driver in elevation. Fig. 25 represents a cross-section on the line 25 25 shown in Fig. 9, showing the cutting-off device for the wire in section and the driver in elevation. Fig. 26 represents a cross-section on the line 26 26 shown in Fig. 10. Fig. 27 represents a cross-section on the line 27 27 shown in Fig. 18. Fig. 28 represents a detail cross-section on the line 28 28 shown in Fig. 7. Fig. 29 represents a rear view of a portion of the box after having been hinged with the interlocking staples. Fig. 30 represents a top plan view of Fig. 29. Fig. 31 represents a cross-section on the line 31 31 shown in Fig. 30. Fig. 32 represents an enlarged view of one of the staples. Fig. 33 represents a detail end elevation of one of the female staple-formers for the staplers X. Fig. 34 represents a rear view of such female staple-former, and Fig. 35 represents a longitudinal section on the line 35 35 shown in Fig. 34.

Similar letters refer to similar parts wherever they occur on the different parts of the drawings.

In the drawings, A A are the legs or standards of the machine, to which are bolted or suitably secured the work-supports B B, together forming the main frame of the machine.

C is the main driving-shaft, journaled in bearings $c'$ $c'$, secured to the frame of the machine in any suitable manner. $c''$ $c''$ are pinions secured to said shaft C, one at each end, as shown in Fig. 1, the teeth of which mesh in the teeth $d^2$ $d^2$, which latter are continuous and cut on the faces of the disks D D, as shown in the drawings.

$c^3$ is the driving-pulley, keyed or otherwise secured to the main driving-shaft C, and which rotates in the direction of the arrows shown in Figs. 3, 4, and 5.

E is an intermittently-rotating shaft located in the center of the machine and shown in Figs. 1, 2, and 6.

$e'$ and $e'$ are intermittently-operated spur-gears secured to the ends of the shaft E, the teeth of which mesh in the teeth $d'$ $d'$, which latter are intermittent and cut on the faces of the disks D D above mentioned.

To the shaft E are secured the bevel-gears $e''$ $e''$, whose teeth mesh in the teeth of the corresponding bevel-gears $f''$ $f''$, which latter are secured to the vertical shafts $f$ $f$, journaled in bearings F F, as shown in Figs. 2 and 7. To the lower ends of the shafts $f$ $f$ are secured the spur-gears $g$ $g$, the teeth of which mesh in the teeth of similar gears $h$ $h$. (Shown in Figs. 2 and 7.) The gears $h$ $h$ are journaled at $h'$ and have pins or projections $h''$ $h''$ projecting upwardly through the blocks $i$ $i$.

I I are transverse slots in the guide J, and the blocks $i$ $i$ are constrained to move in such slots, as shown in Fig. 7.

To the guide-piece J are secured by screws, as shown in Fig. 7, or made integral with the same the wire-feeders $j$ $j$, through which the wire passes after having been straightened, as shown in the section in Fig. 7.

$j'$ is a spring-pressed pawl having teeth cut on its foot and which by the action of the spring $j''$ is normally held in contact with the wire, as shown, firmly gripping the wire during the forward or feeding stroke and slipping over the wire during the return stroke.

The guide-piece J is intermittently operated by any suitable or well-known mechanism.

To the plate K is secured or cast in one piece with the same the piece L, on which are pivoted at $l$ the toothed pawls $l'$ $l'$, similar in form to the pawls $j'$ and shown in detail in Fig. 28. The object of these pawls is to prevent the wire from being drawn back during the return motion of the feeding device.

M M are standards attached to the frame of the machine, as shown, and which support the cross-bar M'', on which are pivoted the drums or reels $m$ $m$ $m$ $m$, on which the wire N is wound and which is carried from the said reels diagonally downward and under the guide-wheels $n$ $n$ $n$ $n$, which guide-wheels have preferably V-shaped grooves on their periphery and are provided with guards $n'$ $n'$ $n'$ $n'$ to prevent the wire from jumping, as shown in Figs. 2 and 7.

$n''$ $n^5$ are loosely-journaled rollers, in contact with which the wire is carried during the wire-straightening operation previous to being acted upon by the wire-feed device hereinabove described.

$d^3$ $d^3$ are intermittently-operated gears cut on the faces of the disks D D, whose teeth engage the teeth of the pinions $p$ $p$, said pinions being secured to shafts $p'$ $p'$, journaled in bearings attached to or made integral with the frame of the machine, as shown in Figs. 1 and 2. $p''$ $p''$ are similar pinions secured to the opposite ends of the shafts $p'$ $p'$, and one of said pinions is seen in Fig. 4 of the drawings, where it will be noticed as meshing with the teeth of the pinions $o''$ and $o^3$. The pinion $o^3$ is made integral with the spur-gear $o^4$, pivoted at $o^6$ to the outwardly-projecting carriage-bed $s^9$, as shown in Fig. 2.

$o^5$ is a rack (shown in Figs. 1 and 3) in which the teeth of the spur-gear $o^4$ mesh and which serves to move the carriage S and its box $b'$ inward to and outward from the center of the machine.

$d^4$ $d^4$ are the remaining sets of teeth cut on the faces of the disks D D, and they are shown in Figs. 1 and 2. These teeth are intermittent and mesh with the teeth of the pinions $o$ $o$, which latter are made fast to the shafts $o'$ $o'$, journaled in suitable bearings above the shafts $p'$ $p'$, and the said shafts $o'$ $o'$ carry on their opposite ends the pinions $o''$ $o''$. (Shown in Figs. 1, 2, and 4.) The teeth of said pinions $o''$ $o''$ mesh in the teeth of the pinions $p''$ $p''$ before described and shown in Fig. 4.

$q$ $q$ $q$ $q$ are slotted castings supporting the standards M M, and said slotted castings are preferably made integral with the legs A A and serve as guides and bearings for the blocks $q'$ $q'$ $q''$ $q''$. (Shown in Figs. 3 and 5.) On the outer faces of said blocks are pivoted the rollers $q^3$ $q^3$ $q^4$ $q^4$, as shown in dotted lines in Figs. 3 and 5 and also in section in Fig. 2.

$d^5$ $d^5$ are cam-grooves formed on the interior of the toothed disks D D, and said grooves receive the rollers $q^3$ $q^3$ $q^4$ $q^4$. Thus by a continuous rotation of the disks D D an intermittent radial motion is imparted to the guide-blocks $q'$ $q'$ $q''$ $q''$, as will be apparent from an inspection of the cam-grooves $d^5$, which are made in part concentric with the disks D D.

$r$ $r$ are shafts journaled in bearings in the legs A A, and said shafts have secured to or made integral therewith the clamping-cams $r'$ $r'$. Said cams $r'$ $r'$ are operated simultaneously, as follows: On the inside of each disk D is cast the inwardly-projecting lug $d^6$, (shown in Figs. 3 and 5,) and said lug or ear or projection $d^6$ is made to form a continuation of the cam-surface $d^7$. (Shown in Fig. 5.) The lever-arms $r''$ $r'''$, which are integral with the shafts $r$ $r$, are provided with rolls $r^3$, and said rolls are operated upon by the projections $d^6$ $d^6$ during each revolution of the disk D and forced downwardly, traveling upon the cam-surface $d^7$ as the disk D is rotated in the direction shown by the arrow in Fig. 5. During this operation the clamping-cam $r'$ is moved in the direction shown by the arrow thereon in Fig. 5, and at the time of this operation the lower edge of the carriage S has been driven inward to the center of the machine and, being located at the end of its stroke over the clamping-cams $r'$ $r'$, is lifted bodily upward by said cams until the box-body, supported on the movable carriage S, is in close clamped contact with the bottom portions of the staplers X Y. As the disks D D continue their rotary motion the stapler mechanism is brought into play, the rolls $r^3$ $r^3$ meanwhile bearing upon the cam-surface $d^7$, which latter is preferably made concentric with the disk D, and at the conclusion of the stapling operation the rolls are at the point $d^8$, when they become released and the clamping-cams $r'$ $r'$ fall back to their original positions. (Shown in Fig. 5.)

s represents the transverse box-support, secured to the carriage S or cast in one piece with the same, as may be desired, and said transverse support or brace is provided with a longitudinal slot $s'$, adapted to receive the adjustable box-rests $s''$ $s''$, which latter have a number of pointed projections made on their upper faces, as shown in Figs. 1, 2, and 4, and which are forced into the box during the clamping operation, and thus additionally prevent any play of the box $b'$ while it is being hinged.

$s^3$ $s^3$ are adjustable blocks provided with tempered spring-stops, which latter bear against the ends of the box $b'$, as shown, and are made flaring at their outer ends, thus serving as a ready means for centering the boxes on the carriage preparatory to hinging the same.

Below the transverse box-support s is a similar transverse adjustable cover-support $t$, also secured to the carriage S, and said cover-support is provided with a projection $t'$, preferably cast in one piece with the transverse bar $t$, and which serves to support the bottom of the cover $b^2$, as shown in Figs. 1, 2, 3, and 4. Adjustable spring-stops $t^3$ $t^3$, similar to the spring-stops $s^3$ $s^3$ before described, are arranged on the inner side of the transverse box-support s, as shown in Fig. 1. The operator places the cover $b^2$ between the said stops $t^3$ $t^3$ and allows its bottom to rest on the projection $t'$, as shown. The inner side of the transverse bar $s$ is beveled, as shown in Fig. 4, and against this beveled portion the inner and upper portion of the box-cover $b^2$ rests. Means for adjusting the position of the box and cover supports relative to the box-carriage are shown in Figs. 1, 2, and 4, and consist of adjusting-screws $s^6$ $s^6$, working loosely in the part $s^7$ and through sliding wedges secured to the carriage-body. Such wedges, however, are not shown in the drawings, as any well-known means for adjustment may be used without departing from the essence of my invention. When the adjustment, vertical or horizontal, or both, has been made, the clamping-bolt $s^8$ is tightened, and thus the adjusting part $s^7$ and carriage S are secured together.

U U and V V are adjustable rotary levers longitudinally adjustable upon the shaft E, and said levers are provided with rollers $u$ $u$ $v$ $v$, which rollers during the intermittent rotation of the shaft E come in contact with the wire-cutting levers $u'$ $u'$ $v'$ $v'$ and cause said levers to be moved outwardly for a purpose hereinafter to be more fully described.

W W are clenching-blocks adapted to clench the staples as they are driven through the box-cover $b^2$, and said clenching-blocks are made longitudinally adjustable upon the work-support B and are secured in the desired position by tightening of the clamping-bolts $w$ $w$.

$w''$ is a projection on the clenching-block, which is used to bend the points of the staples into the cover $b^2$, as shown in Fig. 31. The clenching of the staples for the box $b'$ itself is done upon the box-rests $s''$ $s''$ previously described, and said rests are provided with projections $s^4$ $s^4$, against which the points of the staples strike when driven and are then bent upwardly and into the box-body $b'$, as shown in Fig. 31.

Z Z' are longitudinal driving-bars connected directly to lugs or ears $z$ $z'$ on the interior of the guide-blocks $q'$ $q'$ $q''$ $q''$ by means of bolts $z''$ $z''$, as shown in Fig. 5. These bars have a reciprocating radial movement the same as that of the blocks $q'$ $q'$ $q''$ $q''$, and said bars are provided with the adjustable yokes $z^3$ $z^3$ $z^4$ $z^4$, which are clamped in their required positions upon the driving-bars by means of the binding-bolts $z^5$ $z^5$, as shown in Figs. 1, 2, and 4. Said yokes are adapted to receive the trunnions or pins $x^{18}$ $x^{18}$ $x^{18}$ $x^{18}$ $y^{17}$ $y^{17}$ $y^{17}$ $y^{17}$ of the staple-driving mechanism, as will hereinafter be more fully described.

X X are the drivers for the box-cover staples, and Y Y are the drivers for the box-body staples, and these two sets of drivers form one of the principal features of my invention.

Mechanism for simultaneously cutting and pointing the staple-wire, mechanism for forming the cut and pointed wire into staples of a form as shown in Fig. 32, and mechanism for driving such formed staples in interlocked positions into the cover $b^2$ and body of the box $b'$ are contained in what I term the "drivers," the description and operation of which will be treated separately.

X represents one of the pair of drivers for the box-cover staples, and $x$ is the main casting of the same, preferably made in one piece with the plate K, on which the feeding device is secured, as shown in Fig. 6, said plate being adjustable on the work-supports B B and secured in its adjusted position by means of bolts $k$ $k$ $k$ $k$ passing through the slots $k'$ $k'$ $k'$ $k'$ in the plate K, as shown, and through the holes $b$ $b$ $b$ $b$ in the work-support, as represented, such adjustment being necessary in order to vary the distance between the hinged joints according to the size of the box to be hinged.

$x'$ is a removable cap or cover piece made semicircular on its interior and, in connection with the corresponding semicircular channel in the part $x$, is adapted to form the guide or bearing $x^2$ for the driving device, which will hereinafter be described.

$x^3$ is a spiral or inclined groove in the bottom of the bearing-surface $x^2$, as shown in dotted lines in Figs. 8, 9, and 10 and in cross-section in Figs. 11, 12, and 13. In said groove $x^3$ is located a pin or pin and roll $x^4$, adapted to be moved spirally in the slot, and said pin is secured to the revoluble collar $x^6$.

$x^7$ $x^7$ are extensions of the collar $x^6$ and provided at their upper ends with the lips $x^8$ $x^8$.

The collar $x^6$ is revolubly secured to the female portion of the driving device by means of a pin in the collar and which is received in an annular groove in the reduced part of the female portion, as shown in the drawings, or other suitable means may be employed for securing the collar and female portion $x^9$ in their required relation without departing from the essence of my invention.

On the under side of the female portion of the staple-forming mechanism are made projections $x^{10}$, rounded at their lower ends, as shown in Fig. 11, and in such projection $x^{10}$ is made a slotted recess $x^{11}$, adapted to receive the staple as it is formed.

$x^{12}$ represents the male former, which is provided with a projecting pin $x^{13}$, and said male former is transversely movable relative to the path of the driver in the guide $x^{14}$, said guide being secured in a suitable manner to the base portion $x$.

$x^{15}$ is a slot in said guide, in which the male former $x^{12}$ is located.

$x^{16}$ is a continuation of the slot $x^{15}$ and is made in the part $x$, as shown, and receives the lower part of the former $x^{12}$ during the driving of the staples.

$x^{17}$ $x^{17}$ are fingers secured to the lower portion of the female portion of the forming device, as shown in Figs. 11, 12, 13, 14, and 15, and said fingers are adapted to hold the male former $x^{12}$ up when the staple is being formed and to lower the same into its recess $x^{16}$ just before the staple is driven.

$x^{18}$ are trunnions made integral with the block $x^{19}$, and said trunnions are encompassed by the yokes $z^3$ $z^3$ on the driving-bar Z before mentioned. The block $x^{19}$ is guided in the cut-away portions of the cover or cap $x'$ and base part $x$, as shown in Fig. 25, and said block is bored out cylindrically to receive the hammer-head $x^{20}$. The form of the block $x^{19}$ is clearly shown in Fig. 26. The hammer-head $x^{20}$ is screw-threaded on its upper end and may be firmly held in its adjusted position by means of the locking-nut $x^{21}$. The lower part of said hammer-head terminates as a flange $x^{22}$ for a purpose as will be hereinafter more fully described. The interior of the hammer-head is tapped to receive the upper screw-threaded portion of the hammer $x^{23}$, as shown in the drawings. In order to drive staples of varying lengths, it is evident that the position of the hammer in relation to the fixed male former $x^{12}$ must be changed, and this adjustment is accomplished as follows: The hammer-head $x^{20}$ is held in a locked position relative to the block $x^{19}$ by means of the locking-nut $x^{21}$, and the hammer $x^{23}$ is also held fixed with respect to both the hammer-head $x^{20}$ and the block $x^{19}$ by means of the auxiliary nut $x^{24}$. It will be seen from the drawings that when the nut $x^{21}$ is slackened the hammer-head $x^{20}$, which is internally screw-threaded, as before stated, and which is in reality an elongated nut, may be turned about the longitudinal axis of the hammer $x^{23}$ in either a right or left hand direction, and since the block $x^9$, with its trunnions $x^{18}$ $x^{18}$, is held fixed during such operation it is evident that the hammer $x^{23}$ will be moved in a longitudinal direction either to or from the male former, according to the manner of turning the head $x^{20}$. After such adjustment has been accomplished both the nuts $x^{21}$ and $x^{24}$ are screwed down against their respective seats, and the head and hammer are thus held fixed in their adjusted positions. Said hammer is made $+$-shaped in section throughout its lower half, its extreme lower end terminating in an arc form to fit around the head of the formed staple, as shown.

$x^{25}$ is a $+$-shaped slot made in the cover or cap $x'$, the base $x$, former-guide $x^{14}$, and extending through the female portion of the forming device $x^9$, as shown, said slot serving as a guide for the hammer and also in part as a guide for the formed staple as it is being driven. During the downward movement of the staple-forming device the collar $x^6$ is caused to revolve on the reduced upper portion of the female former $x^9$. This turning motion is caused by the travel of the roll $x^4$ in its spiral recess $x^3$, and the object of said partial rotation is to allow the female former $x^9$ to move downward with the collar $x^6$ and its extended portions $x^7$ $x^7$ during the first part of the stroke, thereby allowing the lips $x^8$ $x^8$ to escape from contact with the flange $x^{22}$ of the hammer-head $x^{20}$ slightly before the time of the staple-driving operation, during which operation the female forming device is stationary and the hammer $x^{23}$ passed through it, as represented in Figs. 12 and 13.

The wire cutting and pointing mechanism for the box-cover staples is shown in Figs. 8, 9, 10, 14, 15, and 25, and consists of a lever $u'$, to the lower end of which is secured the shaft $u''$, suitably journaled in bearings, as shown. Said shaft carries at its opposite end the tooth $u^3$, which latter is received in a slot $u^4$, made in the lower cutter-block $u^5$, as shown in Fig. 25, and through an aperture in said cutter-block $u^5$ the staple-wire passes, as shown in Fig. 8. $u^6$ is the opposing cutter-block, and such block may be adjusted, if necessary, and held in its adjusted position by means of the set-screw $u^7$. The cutting-surfaces of each block are beveled at a suitable angle in order to form the requisite pointed ends to the staple-wire.

The operation of the cutting and forming mechanism for the box-cover staples is as follows: After the wire N has been fed through the cutter-block $u^5$ by means of the feeding mechanism previously described and when such wire is in a position as shown in Fig. 8 the rollers $u$ $u$ on the rotary levers U U come in contact with the levers $u'$ $u'$ and force them outward, causing the cutter-block $u^5$ to be moved in the direction of the arrow shown in Fig. 25 and the wire to be cut and pointed. The lever $u'$ is then returned to its original position by the influence of a suitable spring $u^8$. (Shown in Figs. 4 and 6.) When the cut-off and pointed portion of wire has been located in a position as shown in Fig. 8, the driving-bar Z moves diagonally downward and causes the block $x^{19}$ to descend. The female portion of the forming device and the collar $x^6$ and its projections $x^7$ $x^7$ descend with the block $x^{19}$; but the said collar and its projections are given a partial rotary motion upon the reduced part of the female portion $x^9$ due to the pin $x^4$, which is constrained to move in the before-mentioned groove $x^3$. This spiral movement is continued until the extensions $x^7$ $x^7$ of the revoluble collar come opposite the cut-away portions of the block $x^{19}$, as represented in Fig. 9. During the downward movement of the collar $x^6$ and its attached parts the cut and pointed portion of wire has been formed into a staple, as shown in Fig. 9, by means of the benders or projections $x^{10}$ of the female portion, which have bent the wire around the male former $x^{12}$ (then in its upper position, as shown in Fig. 14) and received the formed staple in the slot or guide $x^{11}$. Upon the formation of the staple the male former is caused to descend into the groove $x^3$, as shown in Figs. 12 and 15, by the action of the fingers $x^{17}$ $x^{17}$ upon the pins $x^{13}$. At the close of the forming operation the hammer is located just above the formed staple, in a position as shown in Fig. 12, and as the block $x^{19}$ continues its downward motion the hammer forces the staple out of its guides, as shown in Figs. 10 and 13, and into the box-cover. After the staple has been driven into the box-cover $b^2$ and clenched against the block W the driving-bar Z returns diagonally upward and causes the hammer, hammer-head, revoluble collar, &c., to again return to their original positions, as shown in Fig. 8. No upward motion is imparted to the female portion $x^9$ nor to the revoluble collar $x^6$ until the flange $x^{22}$ on the hammer-head $x^{20}$ comes in contact with the lips $x^8$ $x^8$, causing the collar $x^6$ to be again partially revolved and to ascend with a spiral motion to its original position, the roller $x^4$ meanwhile passing from the position shown by dotted lines in Fig. 10 to the position shown by dotted lines in Fig. 8. As the revoluble collar $x^6$ ascends the female portion $x^9$ follows it, though without a rotary motion, and during the upward movement of said female portion the wedge-shaped parts of the fingers $x^{17}$ $x^{17}$ act upon the pin $x^{18}$ of the male former $x^{12}$ and force the said former upward into its original position. (Shown in Fig. 8.)

Y represents one of the pair of drivers for the box-body staples, and $y$ is the main casting of the same, preferably made in one piece with the plate K, as shown in Fig. 6.

$y'$ is a removable cap or cover-piece made semicircular on its interior and in connection with the corresponding hemispherical channel in the part $y$ is adapted to form the guide or bearing $y^2$ for the forming device, which will hereinafter be described.

$y^3$ is a spiral or inclined groove in the bottom of the bearing-surface $y^2$, as shown in dotted lines in Figs. 16, 17, and 18 and in cross-section in Figs. 19, 20, and 24. In said groove $y^3$ is located a pin or pin and roll $y^4$, adapted to be moved diagonally in the groove, and said pin is secured to the female portion of the forming device $y^6$.

$y^7$ $y^7$ are extensions of the female portion of the forming device $y^6$, and said extensions are provided at their upper ends with the lips $y^8$ $y^8$. On the under side of the female portion of the staple-forming device $y^6$ are made projections or benders $y^9$, rounded at their lower ends, as shown in Fig. 20, and in such projections $y^9$ is made a groove $y^{10}$, adapted to receive the staple as it is formed.

The staples formed by the mechanism Y Y are turned through an angle of ninety degrees while being formed and are driven interlocked with the staples previously driven into the box-cover by the mechanism X X, as shown in detail in Figs. 29, 30, and 31. The stapler Y differs from the stapler X in the following respects: The female former $y^6$ and the male former $y^{12}$, with its guide $y^{11}$, are designed to revolve in unison through an angle of ninety degrees, or thereabout, during the formation of the said staple in order that said staple may be located at its formation in a plane approximately at right angles to the plane of the staple formed by the X staples. To accomplish this, I dispense in the Y drivers with the revoluble collar $x^6$ and stationary guide $x^{14}$ shown in the X drivers, and in lieu thereof provide in the drivers Y Y means for rotating the staple forming parts through an angle of ninety degrees, as will be described hereinafter. The guide $y^{11}$ is made slotted, as shown, to receive the male former $y^{12}$, which is transversely movable relative to the path of the driver, and said guide is revoluble in its bearings $y^2$. $y^{13}$ is an annular recess cut around the lower portion of said guide, and $y^{14}$ is a pin secured in a suitable manner to the base portion $y$ and received in said annular recess $y^{13}$, thus preventing any vertical movement of the guide $y^{11}$.

$y^{15}$ $y^{15}$ are fingers secured to the bottom part of the female portion of the forming device, as shown, and said fingers are adapted to force the male former $y^{12}$ downward and outward after the staple has been formed and during the rotation of the forming device.

$y^{16}$ is a cam projection secured in a suitable manner to the base portion $y$ and shown in Figs. 16, 17, 18, 22, and 23. The office of this cam is to force the male former upward and inward to its original position after the staple has been driven, and such work is performed during the return motion of the forming device.

$y^{17}$ $y^{17}$ are trunnions made integral with the block $y^{18}$, and said trunnions are encompassed by the yokes $z^4$ $z^4$ on the driving-bar $Z'$ before mentioned. The block $y^{18}$ is guided in the cut-away portions of the cover or cap $y'$ and base part $y$, as shown in Fig. 24, and said block is bored out cylindrical to receive the hammer-head $y^{19}$. The form of the block $y^{18}$ is clearly shown in Fig. 27, where it will be noticed as being the duplicate of the block $x^{19}$. (Shown in Fig. 26.) The hammer-head $y^{19}$ is screw-threaded on its upper end and may be firmly held in its adjusted position by means of the locking-nut $y^{20}$. The lower part of said hammer-head terminates as a flange $y^{21}$ for a purpose as will hereinafter be more fully described. The interior of the hammer-head is bored out cylindrical and tapped to receive the upper screw-threaded portion of the hammer $y^{22}$, as shown in the drawings. Said hammer is made $+$-shaped in section throughout its lower half, and its extreme lower end terminates in an arc form to fit around the head of the formed staple, as shown. $y^{23}$ is a nut for securing the hammer $y^{22}$ to the hammer-head $y^{19}$ after the stroke of said hammer has been adjusted. The longitudinal adjustment of the hammer $y^{22}$ with respect to the male former $y^{12}$ is obviously the same as that previously described for the hammer $x^{23}$.

$y^{24}$ is a $+$-shaped slot made in the cover or cap $y'$, base portion $y$, revoluble former-guide $y^{11}$, and extending through the female portion of the forming device $y^6$, as shown, said slot serving as a guide for the hammer and also in part as a guide for the formed staple as it is being driven.

The wire cutting and pointing mechanism for the box-body staples is shown in Figs. 16, 17, 18, and 24, and consists of a lever $v'$, pivoted at $v''$ in the slotted projection made on the cap $y'$, one-half of said slotted projection being shown in Fig. 24. Said lever $v'$ has a cam-shaped end $v^4$, to which is pivoted at $v^5$ the vertically-movable cylindrical cutter $v^6$, preferably made slotted in its upper end to receive the cam $v^4$. On the under side of the cylindrical cutter $v^6$ is a projecting knife $v^7$, adapted to be received in the slotted recess $v^8$ of the opposing cutter-block $v^9$, said cutter-block $v^9$ being shown in top plan view in Figs. 16, 17, and 18 and in longitudinal cross-section in Fig. 24. After the staple-wire has been fed across the face of the cutter-block $v^9$ by means of the feeding mechanism previously described the roller of the rotary lever $v$ on the shaft V comes in contact with the lever $v'$ and forces it outward, causing the cutter-block $v^6$ to move downward and to cut out a short piece from the wire N, leaving the said wire in a condition as shown in Fig. 22. After the wire has thus been cut and pointed the lever $v'$ is returned to its original position by means of a suitable spring $v^{10}$. (Shown in Figs. 4 and 6.)

When the cut-off and pointed portion of wire has been located in a position, as shown in Fig. 16, the driving-bar $Z'$ moves diagonally downward and causes the block $y^{18}$ to descend. The female portion of the forming device $y^6$ descends with the said block, but with a rotary motion due to the pin and roll $y^4$, which is constrained to work in the spiral or inclined groove $y^3$. The guide $y^{11}$ is caused to rotate in unison with the part $y^6$, since the under portion of the part $y^6$ is in contact with the upper surface of the guide $y^{11}$, as shown in Fig. 16. As the above-mentioned parts commence to rotate the benders or projections $y^9$ bend the cut-off portion of wire around the male portion of the forming device $y^{12}$ into a staple and such staple is received in the slotted recess $y^{10}$. As soon as the staple has been formed the fingers $y^{15}$ $y^{15}$ act upon the pin in the said former $y^{12}$ and force it downward and outward, as before described. At this stage of the operation the lips $y^8$ $y^8$ on the extensions $y^7$ $y^7$ come opposite the cut-away portions of the block $y^{18}$, as shown in Fig. 17, and the pin and roll $y^4$ has meanwhile traveled to the opposite end of its spiral or inclined groove $y^3$. No further rotary motion is imparted to the forming device, and the block and hammer are now free to descend between said extensions $y^7$ $y^7$ to their lowest positions, as shown in Fig. 18, where the staple is shown as forced out of its guides at right angles to the staple previously driven into the box-cover by the mechanism X. After the staple has been driven into the box-body $b'$ and clenched against the block $s''$ the driving-bar $Z'$ returns diagonally upward and causes the hammer, hammer-head, forming device, &c., to return to their original positions, as shown in Fig. 16.

No upward motion is imparted to the female portion of the forming device $y^6$ nor to the revoluble guide $y^{11}$ until the flange $y^{21}$ comes in contact with the lips $y^8$ $y^8$, causing the part $y^6$ and guide $y^{11}$ to return with an opposite spiral motion to their original positions.

During the upward movement of the above-mentioned parts the fingers $y^{15}$ $y^{15}$ are withdrawn from the pin of the male former $y^{12}$ and said former is caused to move inward and upward, traveling on the cam-surface $y^{16}$ to a position as shown in Fig. 22.

The consecutive operation of the entire hinging-machine is as follows: When belt-power is applied to the driving-pulley $c^3$, a continuous rotation is imparted to the driving-shaft C and from it to the disks D D through the pinions $c''$ $c''$ and gears $d''$ $d''$. During the rotation of said disks the intermittently-operated gears $d^3$ $d^3$ intermesh with the pinions $p$ $p$ and cause the box carriage or table S (on which have been previously located by the operator the detached box $b'$ and cover $b^2$ in their relative positions, as shown in Fig. 4) to move inward to the center of the machine. During the travel of the carriage or table inward the intermittently-operated gears $d'$ $d'$ on the disks D D have intermeshed with the gears $e'$ $e'$, secured to the shaft E, and said shaft E is caused to rotate. During the rotation of the shaft E the bevel-gears $e''$ $e''$ mesh in the bevel-gears $f''$ $f''$, which causes the rotation of the vertical shafts $f$ $f$ and their spur-gears $g$ $g$. The rotation of said spur-gears $g$ $g$ causes the spur-gears $h$ $h$, intermeshing with the former, to revolve, and the pins $h''$ $h''$, secured to the gears $h$ $h$, cause the blocks $i$ $i$ to be moved transversely in their slots I I, thus imparting a forward horizontal motion to the guide-pieces J J and the wire-feeders $j$ $j$ $j$ $j$, secured to the said guides, thus feeding into the drivers X X Y Y the four ends of the staple-wires N, said wires N having been drawn through the straightening-rolls $n''$ $n''$ $n''$ $n''$ $n^5$ $n^5$ $n^5$ $n^5$. As the pins $h''$ $h''$ continue their course the guides J J and wire-feeders $j$ $j$ $j$ $j$ are returned to their original positions, while the toothed pawls $l'$ $l'$ $l'$ $l'$ hold the wire already fed in fixed position. At the completion of this wire straightening and feeding operation the rollers $u$ $u$ $v$ $v$ on the respective rotary levers U U and V V act upon the respective cutting-levers $u'$ $u'$ $v'$ $v'$, and in a manner previously described in detail cause the staple-wires N to be cut off at a proper length and pointed at these cut-off ends. It will be clearly seen from an inspection of the cutting mechanism that the cut-off ends of the continuous wires N are simultaneously pointed. At the completion of the above-mentioned operation the box and cover are located in their position for being hinged, and at such a time the projections $d^6$ $d^6$ of the cams $d^7$ $d^7$ act upon the rollers $r^3$ $r^3$ of the levers $r''$ $r''$, and thus the shafts $r$ $r$, carrying at their inner ends the cams $r'$ $r'$, are partially rotated, causing the carriage S to be lifted slightly upward, thus securely clamping the box $b'$ against the bottom of the drivers X X Y Y, while the cover $b^2$ is held fast between the clenching-blocks W W and the beveled support $s$. The rollers $q^3$ $q^3$ on the blocks $q'$ $q'$ are now moved downward in the cam-grooves $d^5$ $d^5$, causing the driving-bar Z to descend diagonally downward toward the center of the machine, thereby operating the forming and driving mechanism for the box-cover staples in a manner as hereinbefore fully described. The staples for the box-cover $b^2$ having been driven and clenched, the rollers $q^4$ $q^4$ on the blocks $q''$ $q''$ also move downward in the cam-grooves $d^5$ $d^5$, thus causing the driving-bar Z' to descend diagonally downward toward the center of the machine, thereby operating the forming and driving mechanism for the box-body staples in a manner as hereinbefore fully described. The box $b'$ and its cover $b^2$ now being securely and neatly hinged together by means of the interlocking and clenched wire staples the driving-bars Z Z' ascend in order to their original up positions, the clamping-levers are released, and the box carriage or table is driven outward by means of the gears $d^4$ $o$ $o''$ $p''$ $o^3$ $o^4$ and rack $o^5$ to its original position, when the operator removes the hinged box and replaces it with another box and detached cover to be hinged in a similar manner, and so on during the operation of the machine.

Having thus fully described the nature, construction, and operation of my invention, I wish to secure by Letters Patent and claim—

1. In a box-hinging machine in combination a wire cutting, pointing, staple forming and driving device, an automatically-movable adjustable table or carriage having longitudinally-adjustable box-rests, and clenching-blocks combined, vertically-adjustable box-cover support, longitudinally-adjustable clenching-blocks for the box-cover staples and longitudinally-adjustable yielding spring-stops for centering the box and cover relative to the staple-driving mechanism substantially as and for the purpose set forth.

2. In a box-hinging machine a wire cutting, pointing, forming and driving mechanism for the box-cover staples, consisting of an intermittently-actuated cutting and pointing device, an intermittently-actuated hammer, an intermittently-actuated male former, longitudinally-reciprocating wire-benders adapted to bend the staple-blank upon the male former, a collar or sleeve revoluble on the female former, and means for automatically releasing said collar or sleeve from the hammer-head previous to and during the driving operation, substantially as and for the purpose set forth.

3. In a box-hinging machine, a wire cutting, pointing, forming and driving mechanism for the box-body staples, consisting of an intermittently-actuated cutting and forming device, an intermittently-actuated hammer, an intermittently-actuated male former, longitudinally-reciprocating and revoluble wire-benders adapted to bend the staple-blank upon the male former, a revoluble slotted guide for said former and means for intermittently oscillating said guide, male former and wire-benders during the staple-forming operation and means for releasing the said forming mechanism from the hammer-head previous to and during the driving operation, substantially as and for the purpose set forth.

4. In a box-hinging machine, in combination an intermittently-operated wire-feeding device, a pair of wire cutting, pointing, staple forming and driving devices, a horizontally-movable carriage, upon which the box and cover are supported and a pair of stationary inclined staplers X, Y, each of which contains staple forming and driving devices, one of said staplers having automatic mechanism substantially as described for turning the staple a partial revolution so as to cause it to be driven interlocked with the staple formed and driven in the opposite stapler as and for the purpose set forth.

5. In a box-hinging machine, in combination, an intermittently-operated wire-feeding device, a pair of wire cutting, pointing, staple forming and driving devices, a horizontally-movable carriage upon which the box and cover are supported, automatic means for adjusting said carriage to and from the staple-driving devices, automatic means for clamping and holding the box and cover in position during the driving and clenching operation and a pair of stationary inclined staplers X, Y, each of which contains staple forming and driving devices, one of said staplers having automatic mechanism substantially as described for turning the staple a partial revolution so as to be driven interlocked with the staple formed, and driven in the opposite stapler as and for the purpose set forth.

In testimony whereof I have hereunto set my hand in presence of two subscribing witnesses.

DAVID HENRY SAUNDERS.

Witnesses:
ALBAN ANDRÉN,
KARL A. ANDRÉN.